United States Patent

Moser et al.

[11] 4,077,902
[45] Mar. 7, 1978

[54] NICKEL STABILIZERS FOR SYNTHETIC POLYMERS

[75] Inventors: Paul Moser, Riehen; Jean Rody, Basel, both of Switzerland

[73] Assignee: Ciba-Geigy Corporation, Ardsley, N.Y.

[21] Appl. No.: 663,333

[22] Filed: Mar. 3, 1976

Related U.S. Application Data

[63] Continuation-in-part of Ser. No. 524,684, Nov. 18, 1974, abandoned.

[51] Int. Cl.² .................... C08K 5/52; C08K 5/53
[52] U.S. Cl. .................... 252/400 A; 260/45.75 W
[58] Field of Search ............ 260/45.75 N; 252/400 A

[56] References Cited
U.S. PATENT DOCUMENTS

| | | | |
|---|---|---|---|
| 3,189,630 | 6/1965 | Smutny | 260/45.75 |
| 3,312,658 | 4/1967 | Kamijo et al. | 260/45.75 |
| 3,692,738 | 9/1972 | Mathis et al. | 260/45.75 |
| 3,824,192 | 7/1974 | DiBattista et al. | 260/45.75 |

*Primary Examiner*—V. P. Hoke
*Attorney, Agent, or Firm*—Nestor W. Shust

[57] ABSTRACT

Mixtures consisting of a compound of the formula I

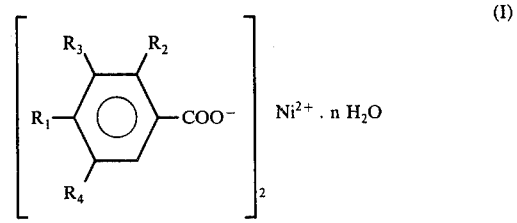

wherein either $R_1$ represents a hydroxyl group and $R_2$ represents hydrogen or $R_1$ represents hydrogen and $R_2$ represents a hydroxyl group, $R_3$ and $R_4$ independently of one another represent hydrogen or alkyl, and $n$ represents a value from 0 to 2, and a compound of the formula II

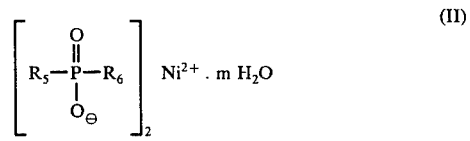

wherein $R_5$ represents alkyl, cycloalkyl, aralkyl, aryl or aralkyl or aryl groups which are mono-, di or tri-substituted by hydroxyl, alkyl, chlorine and/or alkoxy groups, alkoxy, cycloalkoxy, aralkoxy, aryloxy or aralkoxy or aryloxy which are mono-substituted or di-substituted in the aryl radical by alkyl, chlorine and/or alkoxy, $R_6$ represents hydrogen, alkyl, cycloalkyl, aralkyl, aryl or aralkyl or aryl groups which are mono-, di- or tri-substituted by hydroxyl, alkyl, chlorine and/or alkoxy groups, alkoxy, cycloalkoxy, aralkoxy, aryloxy or aralkoxy or aryloxy which are mono-substituted or di-substituted in the aryl radical by alkyl, chlorine and/or alkoxy, and $m$ represents a value from 0 to 2.5, are valuable for stabilizing polymeric substrates.

11 Claims, No Drawings

NICKEL STABILIZERS FOR SYNTHETIC POLYMERS

CROSS-REFERENCE TO RELATED APPLICATION

This is a continuation-in-part application of our co-pending application Ser. No. 524,684, filed Nov. 18, 1974 now abandoned.

The invention relates to new mixtures of nickel complexes, their use as light stabilisers and/or as dyestuff receptors for polymeric substrates, and, as an industrial product, to the polymers which contain the mixtures claimed.

The new mixtures consist of a compound of the formula I

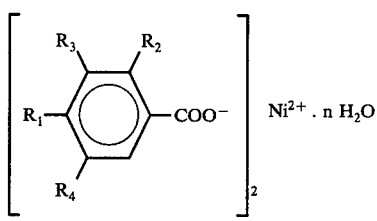

wherein either $R_1$ represents a hydroxyl group and $R_2$ represents hydrogen or $R_1$ represents hydrogen and $R_2$ represents a hydroxyl group, $R_3$ and $R_4$ independently of one another represent hydrogen or alkyl, and n represents a value from 0 to 2, and a compound of the formula II

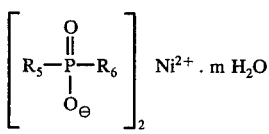

wherein $R_5$ represents alkyl, cycloalkyl, aralkyl, aryl or aralkyl or aryl groups which are mono-, di- or tri-substituted by hydroxyl, alkyl, chlorine and/or alkoxy groups, alkoxy, cycloalkoxy, aralkoxy, aryloxy or aralkoxy or aryloxy which are mono-substituted or di-substituted in the aryl radical by alkyl, chlorine and/or alkoxy, $R_6$ represents hydrogen, alkyl, cycloalkyl, aralkyl, aryl or aralkyl or aryl groups which are mono-, di- or tri-substituted by hydroxyl, alkyl, chlorine and/or alkoxy groups, alkoxy, cycloalkoxy, aralkoxy, aryloxy or aralkoxy or aryloxy which are mono-substituted or di-substituted in the aryl radical by alkyl, chlorine and/or alkoxy, and m represents a value from 0 to 2.5.

Preferred mixtures are those of compounds of the formulae I and II wherein $R_1$ denotes a hydroxyl group, $R_2$ denotes hydrogen, $R_3$ and $R_4$ independently of one another denote hydrogen or alkyl having 1 to 5 carbon atoms, $R_5$ denotes alkyl having 1 to 18 carbon atoms, cyclohexyl, aralkyl having 7 to 11 carbon atoms, aryl having 6 to 10 carbon atoms, aralkyl or aryl groups which are mono-, di- or tri-substituted by hydroxyl, alkyl having 1 to 4 carbon atoms, chlorine and/or alkoxy groups having 1 to 4 carbon atoms, the aralkyl radical containing 7 to 11 carbon atoms and the aryl radical containing 6 to 10 carbon atoms, alkoxy having 1 to 12 carbon atoms, cyclohexoxy, aralkoxy having 7 to 11 carbon atoms, aryloxy having 6 to 10 carbon atoms, or aralkoxy or aryloxy which are substituted in the aryl radical by methyl, chlorine and/or methoxy, the aralkoxy radical containing 7 to 11 carbon atoms and the aryloxy radical containing 6 to 10 carbon atoms, and $R_6$ denotes hydrogen, alkyl having 1 to 18 carbon atoms, cyclohexyl, aralkyl having 7 to 11 carbon atoms, aryl having 6 to 10 carbon atoms, aralkyl or aryl which are mono-, di- or tri- substituted by hydroxyl, alkyl having 1 to 4 carbon atoms, chlorine and/or alkoxy groups having 1 to 4 carbon atoms, the aralkyl radical containing 7 to 11 carbon atoms and the aryl radical containing 6 to 10 carbon atoms, alkoxy having 1 to 12 carbon atoms, cyclohexoxy, aralkoxy having 7 to 11 carbon atoms, aryloxy having 6 to 10 carbon atoms, or aralkoxy or aryloxy which are substituted in the aryl radical by methyl, chlorine and/or methoxy, the aralkoxy radical containing 7 to 11 carbon atoms and the aryloxy radical containing 6 to 10 carbon atoms.

Particularly preferred mixtures are those of compounds of the formulae I and II wherein $R_3$ and $R_4$ denote tert.-butyl, $R_5$ denotes alkyl having 2 to 18 carbon atoms, cyclohexyl, benzyl, phenyl, 4-hydroxy-3,5-di-tert.-butylbenzyl, alkoxy having 1 to 8 carbon atoms, or phenoxy, $R_6$ denotes hydrogen, alkyl having 2 to 12 carbon atoms, cyclohexyl, phenyl or alkoxy having 2 to 8 carbon atoms, n denotes 1 to 1.5 and m denotes 0 to 2.

Among the particularly preferred mixtures of the compounds of the formulae I and II, particularly valuable mixtures are those wherein $R_5$ denotes alkyl having 3 to 18 carbon atoms, 4-hydroxy-3,5-di-tert.-butylbenzyl, n-butoxy or phenoxy, $R_6$ denotes alkoxy having 2 to 8 carbon atoms, n denotes 1.5 and m denotes 0 to 2.

The molar ratio of the compounds of the formulae I and II is preferably 1:0.5 to 1:2, particularly preferentially 1:1 to 1:2. The mixtures indicated in the chains are also particularly preferred.

If $R_3$, $R_4$, $R_5$ or $R_6$ are alkyl, they can be linear or branched alkyl groups, for example methyl, ethyl, propyl, isopropyl, n-butyl, n-hexyl, n-octyl, 2-ethylhexyl, n-dodecyl or n-octadecyl. If $R_5$ or $R_6$ denote aralkyl or substituted aralkyl, they can be, for example, benzyl, 4-methylbenzyl, 4-isopropylbenzyl, 3-chlorobenzyl, 4-methoxybenzyl, 4-hydroxy-3,5-di-tert.-butylbenzyl, 2,4-dichlorobenzyl, 2-chloro-4-methylbenzyl, 1- or 2-naphthylmethyl, phenylethyl or 2-naphthylethyl. In the meaning of aryl or substituted aryl, $R_5$ or $R_6$ can be, for example, phenyl, diphenylyl, naphthyl, 4-methylphenyl, 3-chlorophenyl, 3,4-dichlorophenyl, 4-methoxynaphthyl-1, 4-butoxyphenyl, 3-chloro-4-methylphenyl or 3 -ethoxyphenyl. If $R_5$ or $R_6$ denotes cycloalkyl, it can be, for example, cyclopentyl or cyclohexyl. If $R_5$ or $R_6$ denotes an alkoxy or cycloalkoxy radical, it can be, for example, a methoxy, ethoxy, isopropoxy, butoxy, hexoxy, 2-ethylhexoxy or cyclohexoxy radical. $R_5$ or $R_6$, in the meaning of aralkoxy or substituted aralkoxy, can be, for example, a benzoxy, 4-chlorobenzoxy, 2,4-dichlorobenzoxy, 3-methylbenzoxy or 2-phenylethoxy radical. $R_5$ or $R_6$, in the meaning of aryloxy or substituted aryloxy, can be, for example, a phenoxy, 1-naphthoxy, 4-methylphenoxy, 2-chlorophenoxy, 2,4-dichlorophenoxy or 4-methoxyphenoxy group.

The mixtures of the compounds of the formulae I and II are outstanding stabilisers for polymers against degradation thereof induced by light, and are good receptors for chelatable dyestuffs.

It was already known to stabilise polyolefines by means of simple nickel benzoates. Surprisingly, however, the new mixtures of nickel complexes possess a better heat stability than these salts. They can, therefore, be processed at elevated temperature without the polyolefins becoming discoloured, as they are by the previously known nickel benzoates.

The new mixtures are, above all, superior to the known nickel benzoates in the field of stabilising polethylene, because the mixtures according to the invention dissolve readily in this substrate and do not tend to exude.

In addition, complexes of nickel with thiobisphenols and amines have already been disclosed as stabilisers for polyolefines. In comparison with these compounds, the new mixtures exhibit a substantially better light-protective effect.

Polymeric substrates which should be mentioned as being protected against degradation by the mixtures of the compounds of the formulae I and II, are above all poly-α-olefines, such as polyethylene, crosslinked polyethylene, polypropylene, polyisobutylene, polymethylbutene-1, polymethylpentene-1, polybutene-1, polyisoprene and polybutadiene; and also polystyrene and copolymers thereof, such as, for example, polyacrylonitrile-styrene copolymers or polyacrylonitrile-butadiene-styrene copolymers; copolymers of olefines, such as ethylene-propylene copolymers and propylene-butene-1 copolymers, and terpolymers of ethylene and propylene with a diene, such as, for example, hexadiene, dicyclopentadiene or ethylidenenorbornene; and mixtures of the abovementioned homopolymers, such as, for example, mixtures of polypropylene and polyethylene, polypropylene and polybutene-1, and polypropylene and polyisobutylene. Polypropylene and mixtures thereof, and copolymers containing propylene units, and polyethylene are preferred here.

The mixtures of the compounds of the formulae I and II are incorporated into the substrates in a concentration of 0.01 to 5% by weight, calculated on the material to be stabilised. Preferably, 0.05 to 1.5, particularly preferentially 0.1 to 0.8, % by weight of the mixtures, calculated on the material to be stabilised, are incorporated into the latter. The incorporation can be carried out after the polymerisation, for example by admixture, optionally with further additives, into the melt by the methods which are customary in the art, before or during moulding, or by applying the dissolved or dispersed mixtures to the polymer, if appropriate with subsequent evaporation of the solvent.

The mixtures of the compounds of the formulae I and II can also be incorporated into the polymer to be stabilised in the form of a master batch containing the nickel complex mixture, for example, in a concentration of 2.5 to 25% by weight.

In the case of crosslinked polyethylene, the mixtures are added before crosslinking. The following may be mentioned as examples of further additives with which the stabilisers to be used in accordance with the invention can be conjointly employed:

1. Antioxidants 1.1 Simple 2.6-dialkylphenols, such as, for example, 2,5di-tert.-butyl-4-methylphenol, 2-tert.-butyl-4,6-dimethylphenol, 2,6-di-tert.-butyl-4-methoxymethylphenol and 2,6-dioctadecyl-4-methylphenol.

1.2 Derivatives of alkylated hydroquinones, such as, for example, 2,5-di-tert.-butyl-hydroquinone, 2,5-di-tert.-amyl-hydroquinone, 2,6-di-tert.-butyl-hydroquinone, 2,5-di-tert.-butyl-4-hydroxyanisole, 3,5-di-tert.-butyl-4-hydroxy-anisole, tris-(3,5-di-tert.-butyl-4-hydroxyphenol) phosphite, 3,5-di-tert.-butyl-4-hydroxyphenyl stearate and bis-(3,5-di-tert.-butyl-4-hydroxyphenyl) adipate.

1.3 Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl) disulphide.

1.4 Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butyl-phenol), 2,6-di-(3-tert.-butyl-5-methyl-2-hydroxybenzyl)-4-methylphenol, 2,2'-methylene-bis-[4-methyl-6-(α-methylcyclohexyl)-phenol], 1,1-bis-(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercapto-butane, 1,1,5,5-tetra-(5-tert.-butyl-4-hydroxy-2-methylphenyl)-pentane and ethylene glycol bis-[3,3-bis-(3'-tert.-butyl-4'-hydroxyphenyl)-butyrate].

1.5 O-, N- and S-benzyl compounds, such as, for example, 3,5,3', 5'-tetra-tert.-butyl-4,4'-dihydroxydibenzyl ether, 4-hydroxy-3,5-dimethylbenzyl-mercaptoacetic acid octadecyl ester, tris-(3,5-di-tert.-butyl-4-hydroxybenzyl)-amine and bis-(4-tert.-butyl-3-hydroxy-2,6-dimethylbenzyl)-dithiol terephthalate.

1.6 Hydroxybenzylated malonic esters, such as, for example, 2,2-bis-(3,5-di-tert.-butyl-2-hydroxybenzyl)-malonic acid dioctadecyl ester, 2-(3-tert.-butyl-4-hydroxy-5-methylbenzyl)-malonic acid dioctadecyl ester, 2,2-bis-(3,5-di-tert.-butyl-4-hydroxybenzyl)-malonic acid di-dodecylmercapto-ethyl ester and 2,2-bis-(3,5-di-tert.-butyl-4-hydroxybenzyl)-malonic acid di-[4-(1,1,3,3-tetramethylbutyl)-phenyl] ester.

1.7 Hydroxybenzyl-aromatics, such as, for example 1,3,5-tris-(3,5-di-tert.-butyl-4-hydroxybenzyl)-2,4,6-trimethylbenzene, 1,4-bis-(3,5-di-tert.-butyl-4-hydroxybenzyl)-2,3,5,6-tetramethylbenzene and 2,4,6-tri-(3,5-di-tert.-butyl-4-hydroxybenzyl)-phenol.

1.8 s-Triazine compounds, such as, for example, 2,4-bis-octyl-mercapto-6-(3,5-di-tert.-butyl-4-hydroxy-anilino)-s-triazine, 2-octylmercapto-4,6-bis-(3,5-di-tert.-butyl-4-hydroxy-anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl-s-triazine and 1,3,5-tris-(3,5-di-tert.-butyl-4-hydroxybenzyl) isocyanurate.

1.9 Amides of β-(3.5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-bis-(3,5-di-tert.-butyl-4-hydroxyphenyl-propionyl)-hexamethylenediamine.

1.10 Esters of β-(3,5-di-tert.-butyl-4-hydroxyphenyl)-propionic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2,2,2]octane.

1.11 Esters of β-(5-tert.-butyl-4-hydroxy-3-methylphenyl propionic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2,2,2]octane.

1.12 Esters of 3.5-di-tert.-butyl-4-hydroxyphenylacetic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2,2,2]octane.

1.13 Acylaminophenols, such as, for example N-(3,5-di-tert.-butyl-4-hydroxyphenyl)-stearic acid amide and N,N'-di-(3,5di-tert.-butyl-4-hydroxyphenyl)-thio-bis-acetamide.

1.14 Benzylphosphonates, such as, for example, 3,5-di-tert.-butyl-4-hydroxybenzyl-phosphonic acid dimethyl ester, 3,5-di-tert.-butyl-4-hydroxybenzyl-phosphonic acid diethyl ester, 3,5-di-tert.-butyl-4-hydroxybenzl-phosphonic acid dioctadecyl ester and 5-tert.-butyl-4-hydroxy-3-methylbenzyl-phosphonic acid dioctadecyl ester.

1.15 Aminoaryl derivatives, such as, for example, phenyl-1-naphthylamine, phenyl-2-naphthylamine, N,N'-diphenyl-p-phenylene-diamine, N,N'-di-2-naphthyl-p-phenylenediamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, monooctyliminodibenzyl and dioctyliminodibenzyl and polymerised 2,2,4-trimethyl-1,2-dihydroquinoline.

2. UV absorbers and light protection agents 2.1 2-(2'-Hydroxyphenyl)-benztriazoles, such as, for example, the 5'-methyl-, 3',5'-di-tert.-butyl-, 5'-tert.-butyl-, 5'-(1,1,3,3-tetramethylbutyl)-, 5-chloro-3', 5'-di-tert.-butyl-, 5-chloro-3'-tert.-butyl-5'-methyl-, 3'-sec.-butyl-5'-tert.-butyl-, 3'-α-methylbenzyl-5'-methyl-, 3'-α-methylbenzyl-5'-methyl-5-chloro-, 4'-hydroxy-, 4'-methoxy-, 4'-oxtoxy-, 3',5'-di-tert.-amyl-, 3'-methyl-5'-carbomethoxyethyl- and 5-chloro-3',5'-di-tert.-amyl-derivative.

2.2 2,4-bis-(2'-Hydroxyphenyl)-6-alkyl-s-triazines, such as, for example, the 6-ethyl-, 6-heptadecyl- or 6-undecyl-derivative.

2.3 2-Hydroxy-benzophenones, such as, for examples, the 4-hydroxy-, 4-methoxy-, 4-octoxy-, 4-decyloxy-, 4-dodecyloxy-, 4-benzyloxy-, 4,2', 4'-trihydroxy- or 2'-hydroxy-4,4'-dimethoxy-derivative.

2.4 1,3-bis-(2'-Hydroxy-benzoyl)-benzenes, such as, for example, 1,3-bis-(2'-hydroxy-4'-hexyloxy-benzoyl)-benzene, 1,3-bis-(2'-hydroxy-4'-octyloxy-benzoyl)-benzene and 1,3-bis-(2'-hydroxy-4'-dodecyloxy-benzoyl)-benzene.

2.5 Esters of optionally substituted benzoic acids, such as, for example, phenyl salicylate, octylphenyl salicylate, dibenzoylresorcinol, bis-(4-tert.-butylbenzoyl)-resorcinol, benzoylresorcinol and 3,5-di-tert.-butyl-4-hydroxybenzoic acid 2,4-di-tert.-butyl-phenyl ester, octadecyl ester or 2-methyl-4,6-di-tert.-butyl-phenyl ester.

2.6 Acrylates, such as, for example, α-cyano-β,β-diphenyl-acrylic acid ethyl ester or isooctyl ester, α-carbomethoxy-cinnamic acid methyl ester, α-cyanol-β-methyl-p-methoxy-cinnamic acid methyl ester or butyl ester and N-(β-carbomethoxy-vinyl)-2-methyl-indoline.

2.7 Sterically hindered amines, such as, for example, 4-benzoyloxy-2,2,6,6-tetramethylpiperidine, 4-stearoyloxy-2,2,6,6-tetramethylpiperidine, bis-(2,2,6,6-tetramethylpiperidyl) sebacate and 3-n-octyl-7,7,9,9-tetramethyl-1,3,8-triaza-spiro[4,5]decane-2,4-dione.

2.8 Oxalic acid diamides, such as, for example, 4,4'-di-octyloxyoxanilide, 2,2'-di-octyloxy-5,5'-di-tert.-butyloxanilide, 2,2'-di-dodecyloxy-5,5'-di-tert.-butyl-oxanilide, 2-ethoxy-2'-ethyloxanilide, N,N'-bis-(3-dimethylaminopropyl)-oxalamide, 2-ethoxy-5-tert.-butyl-2'-ethyl-oxanilide and its mixture with 2-ethoxy-2'-ethyl-5,4'-di-tert.-butyl-oxanilide and mixtures of ortho- and para-methoxy- as well as of o- and p-ethoxy-disubstituted oxanilides.

3. Phosphites, such as, for example, triphenyl phosphite, diphenylalkyl phosphites, phenyldialkyl phosphites, tris-(nonylphenyl) phosphite, trilaural phosphite, trioctadecyl phosphite, 3,9-diisodecyloxy-2,4,8,10-tetraoxa-3,9-diphospha-spiro[5,5]undecane and tris-(4-hydroxy-3,5-di-tert.-butylphenyl) phosphite.

4. Compounds which destroy peroxides, such as, for example, esters of β-thiodipropionic acid, for example the lauryl, stearyl, myristyl or tridecyl ester, salts of 2-mercapto-benzimidazole, for example the zinc salt of 2-mercapto-benzimidazole, and diphenylthiourea.

5. Basic co-stabilisers, such as, for example, melamine, benzoguanamine, polyvinylpyrrolidone, dicyandiamide, triallyl cyanurate, urea derivatives, hydrazine derivatives, amines, polyamides, polyurethanes, and alkali metal salts and alkaline earth metal salts of higher fatty acids, for example Ca stearate, Zn stearate, Mg stearate, Na ricinoleate or K palmitate.

6. Nucleating agents, such as, for example, 4-tert.-butyl-benzoic acid, adipic acid and diphenylacetic acid.

7. Other additives, such as, for example, plasticisers, lubricants, emulsifiers, fillers, carbon black, asbestos, kaolin, talc, glass fibres, pigments, flameproofing agents and antistatic agents.

The preparation of the compounds of the formula I is described in U.S. Pat. No. 3,189,690.

The compounds of the formula II can be prepared quite generally by reacting an alkali metal salt of the formula II

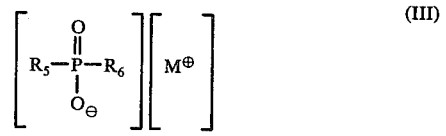

(III)

in a solvent, with a Ni salt of the formula IV

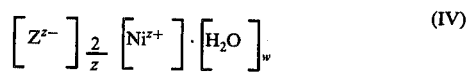

(IV)

in the stoichiometric ratio of III:IV = 2:1. Z denotes any desired inorganic or organic anion with the charge z-, $M^+$ denotes an alkali metal ion and w denotes an index which can assume the values 0 to 6. The symbols $R_5$ and $R_6$ have the same meaning as in the formula II.

Examples of suitable metal salts of the formula IV are nickel chloride dihydrate, nickel chloride hexahydrate, nickel bromide, nickel sulphate hexahydrate and nickel acetate.

Examples of suitable solvents for this reaction are water, alcohols, especially methanol, ethanol and isopropanol, ethylene glycol monoalkyl ethers, dioxane, acetonitrile and mixtures thereof.

The reaction is carried out, for example, by heating the reaction solution briefly to 30°–100° C. In some cases, however, it is merely necessary to mix the components thoroughly in one of the solvents mentioned.

The isolation of the compounds of the formula II depends on the solubility thereof and on the solubility, in the solvent used, of the alkali metal salts $[M+]z[Z^{z-}]$ formed in the reaction. If the compound is insoluble in the solvent, it can be isolated by filtration. If the alkali metal salt is insoluble, it is filtered off and the compound is obtained by evaporating the solution. If both components are soluble, the solution is evaporated and the compound is isolated by extraction with a solvent of low polarity, in which the alkali metal salt is insoluble. Examples of solvents suitable for this purpose are diethyl ether, methylene chloride, chloroform, benzene or toluene.

If the acid on which the alkali metal salt III is based is sufficiently acid, it can be suspended or dissolved in one of the abovementioned solvents and reacted with a suspension of a stoichiometric amount of nickel carbonate, nickel bicarbonate or freshly precipitated nickel hydroxide, by heating at reflux temperature for several hours. In the course thereof, the compound of the formula II is either formed as a solution free from neutral salt or is thrown out as a precipitate.

The use of the mixtures of the compounds of the formulae I and II is described in greater detail in the example which follows. In this, parts deonte parts by weight.

EXAMPLE 1

1,000 parts of polypropylene powder [melt indexx 1.5 g/10 minutes (230° C 2,160 g)] are mixed in a drum mixer with 1 part of pentaerythritol tetrakis-[3-(3',5'-di-tert.-butyl-4-hydroxyphenol)-propionate], 3 parts of dilauryl thiodipropionate (DLTDP) and 5 parts of a light protection agent and the mixture is subsequently homogenised in a Brabender plastograph at 200° C for 10 minutes. The light protection agents used here consists of a mixture of the two components of the formula (I) ($NiX_2 \cdot nH_2O$) and the formula (II) ($NiY_2 \cdot mH_2O$) in the molecular ratio of (I):(II) = $x:y$ (compare the following table). X denotes here in each case the anion of 4-hydroxy-3,5-di-tert.-butylbenzoic acid and n has the value 1.5. The anion of component (II) is designated in Table I which follows.

The polymer composition obtained in this way is pressed for 6 minutes in a heated press at the temperatures mentioned in the table to give sheets 1 mm thick. A visual assessment of the discolouration of the test samples gives the following results:

Table 1

| Light protection agent component $NiY_2 \cdot mH_2O$ Y being | m | x | y | Visual assessment after 6 minutes at 260° C | 280° C | 300° C |
|---|---|---|---|---|---|---|
| HO—[C(CH₃)₃ substituted phenyl]—CH₂—P(=O)(O⁻)(OC₂H₅) | 2.0 | 1 | 1 | n.d. | n.d. | n.d. |
| HO—[C(CH₃)₃ substituted phenyl]—CH₂—P(=O)(O⁻)(OC₄H₉(n)) | 1.5 | 1 | 1 | n.d. | n.d. | n.d. |
| CH₃(CH₂)₃CH(C₂H₅)CH₂—P(=O)(O⁻)(OC₄H₉(n)) | 1.0 | 1 | 1 | n.d. | n.d. | n.d. |
| C₁₂H₂₅—P(=O)(O⁻)(OC₂H₅) | 1.0 | 1 | 1 | n.d. | n.d. | n.d. |
| C₁₈H₃₇—P(=O)(O⁻)(OC₄H₉) | 0 | 1 | 1 | n.d. | n.d. | n.d. to lightly d |
| (CH₃)₂CH—P(=O)(O⁻)(OC₂H₅) | 1.3 | 1 | 1 | n.d. | n.d. | lightly d |

Table 1-continued

| Light protection agent component NiY₂ · mH₂O Y being | m | x | y | Visual assessment after 6 minutes at 260° C | 280° C | 300° C |
|---|---|---|---|---|---|---|
| (n-C₄H₉O)₂P(=O)—O⁻ | 0 | 1 | 1 | n.d. | n.d. | lightly d |
| C₆H₅—O—P(=O)(OC₈H₁₇(n))—O⁻ | 2.0 | 1 | 1 | n.d. | n.d. | lightly d |
| n-C₁₂H₂₅O—P(=O)(H)—O⁻ | 1.0 | 1 | 1 | n.d. | n.d. | n.d. |
| C₁₈H₃₇—P(=O)(OC₄H₉(n))—O⁻ | 0 | 1 | 2 | n.d. | n.d. | n.d. |
| no NiY₂ only NiX₂ · 1½ H₂O | — | 1 | 0 | lightly d to d | strongly d | strongly d |

Abbreviations:
Degree of discolouration:
n.d. no discolouration
d discoloured

EXAMPLE 2

1,000 parts of polypropylene powder (melt index 1.5 g/10 minutes 230° C, 2,160 g) are mixed in a drum mixer with 1 part of pentaerythritol tetrakis-[3-(3′, 5′-di-tert.-butyl-4-hydroxyphenyl) propionate] and 5 parts of a nickel preparation and the mixture is subsequently granulated in an extruder at a temperature of 200°–220° C. The nickel preparation consists of a mixture of two components of the formulae I and II in the molecular ratio of 1:1. The component I denotes here in each case the nickel salt of 4-hydroxy-3,5-di-tert.-butylbenzoic acid, n having the value 1.5. The component II is defined in Table I which follows.

The resulting granules are converted in the customary manner by means of an extruder with a slit die into a film, which is cut into tapes which are then stretched at elevated temperature to 6 times their length and are wound up on a reel. The denier of the tapes is 700–900 and their tensile strength is 5.5–6.5 g/denier.

The polypropylene tapes thus prepared are placed without tension on a sample carrier and are exposed in a 150 Xenotest apparatus. After varying intervals groups of 5 test samples are withdrawn and their tensile strength is determined. The degree of protective action of the individual nickel compounds is given by the "protective factor", which is defined as follows:

"Protective factor" = $\dfrac{\text{Time of exposure of the light-stabilised sample up to 50\% loss of tensile strength}}{\text{Time of exposure of the non-light-stabilised sample up to 50\% loss of tensile strength}}$ The values obtained are listed in Table II which follows:

Table II

| Light protection agent:*⁾ Component of the formula II Anion | m= | Results for the mixture of components I + II Protective factor | Time of exposure up to 50% loss of tensile strength (hours) |
|---|---|---|---|
| Comparative experiment without a nickel preparation |  | 1.0 | 450 |
| C₁₂H₂₅—P(=O)(OC₂H₅)—O⁻ | 1 | 3.5 | 1,590 |
| 4-HO-3,5-di-C(CH₃)₃-C₆H₂—P(=O)(H)—O⁻ | 0 | 3.5 | 1,600 |

Table II-continued

| Light protection agent:*) Component of the formula II | | Results for the mixture of components I + II | |
|---|---|---|---|
| Anion | m= | Protective factor | Time of exposure up to 50% loss of tensile strength (hours) |
| HO—[C(CH₃)₃ benzene C(CH₃)₃]—CH₂—P(=O)(OC₂H₅)—O⁻ | 2.0 | 2.7 | 1,200 |
| (nC₄H₉O)₂ P(=O)—O⁻ | 0 | 4.9 | 2,200 |

*)Component I here is in each case the nickel salt of 4-hydroxy-3,5-di-tert.-butylbenzoic acid (having n = 1.5)

EXAMPLE 3

1,000 parts of polypropylene powder (A, B, C respectively the one as defined for table IIIB) are mixed in a drum mixer with 1 part of pentaerythritol tetrakis-[3-(3′, 5′-di-tert.-butyl-4-hydroxyphenyl)-propionate] and 5 parts of a nickel preparation and the mixture is subsequently granulated in an extruder at a temperature of 200°–220° C. The nickel preparation consists of a mixture of two components of the formuale I and II in the molecular ratio of 1:1 respectively the ratio given in table IIIB. The component I denotes here in each case the nickel slat of 4-hydroxy-3,5di-tert.-butylbenzoic acid, n having the value 1.5. The component II is defined in table III which follows.

The resulting granules are converted in the customary manner by means of an extruder with a slit die into a film, which is cut into tapes which are then stretched at elevated temperature 6o 6 times their length and are wound up on a reel. The denier of the tapes is 700–900 and their tensile strength is 5.5–6.5 g/denier.

The polypropylene tapes thus prepared are placed without tension on a sample carrier and are exposed in a Xenotest apparaturs as defined in table III. After varying intervals groups of 5 test samples are withdrawn and their tensile strength is determined. The degree of protective action of the individual nickel compounds is given by the "protective factor", which is defined as follows:

"PF" = "Protective factor" =

$$\frac{\text{Time of exposure of the light-stabilised sample up to 50\% loss of tensile strength}}{\text{Time of exposure of the non-light-stabilised sample up to 50\% loss of tensile strength}}$$

Table IIIA

Protective factors (PF) for NY₂ alone.

| Test No. | Anion Y | m | Polypropylene | Xenotype | PF | h[1] | $PF_A = \frac{PF_{NiX_2}}{PF_{NiY_2}}$ | remarks |
|---|---|---|---|---|---|---|---|---|
| 1 | C₆H₅—O—P(=O)(OC₈H₁₇(n))—O⁻ | 1 | A | 150 | 2.6 (when repeated: 1,9) | 970 | 3.1 | see test 4 in table IIIB |
| 2 | CH₃(CH₂)₃CH(C₂H₅)CH₂—P(=O)(OC₄H₉)—O⁻ | 2 | B | 150 | 1.6 | 740 | 7.9 | see test 2 in table IIIB |
| 3 | C₁₂H₂₅—P(=O)(OC₂H₅)—O⁻ | 1 | B | 150 | 1.2 | 550 | 10.5 | |
| 4 | C₁₈H₃₇—P(=O)(OC₄H₉)—O⁻ | — | C | 1200 | 2.0 | 1000 | 3.9 | see test 5 in table IIIB |
| 5[2] | HO—[C(CH₃)₃ benzene C(CH₃)₃]—CH₂—P(=O)(OC₂H₅)—O⁻ | 2 | C | 1200 | 2.0 | 800 | 2.4 | in the same test serie the mixture of NiX₂: NiY₂=1:1 (molar) shows in concentration of 0.25% a PF of 2.6 |

[1] h is time for loss of tensile strength of 50% (hours)
[2] concentration in polypropylene is 0.25%.

Table IIIB

| Test No | Light protection agent [1] of formula II, anion | m | ratio $NiX_2:NiY_2$ X | ratio $NiX_2:NiY_2$ Y | PF | h [2] | $PF_B = \frac{PF_{NiX_2}}{PF_{mixture}}$ | remarks [3] |
|---|---|---|---|---|---|---|---|---|
| 1 | comparison without Ni-preparation | — | 1,0 | 150 | 1.0 | 150 | — | |
| 2 | $CH_3(CH_2)_3CHCH_2-\overset{O}{\underset{OC_4H_9}{\overset{\|}{P}}}-O^{\ominus}$ with $C_2H_5$ | 2 | 1 | 1 | 6.8 | 1020 | 1.8 | |
| 3 | $(CH_3)_2CH-\overset{O}{\underset{OC_2H_5}{\overset{\|}{P}}}-O^{\ominus}$ | 1.5 | 1 | 1 | 9.2 | 1380 | 1.3 | |
| 4 | $C_6H_5-O-\overset{O}{\underset{OC_8H_{17}}{\overset{\|}{P}}}-O^{\ominus}$ | 1 | 1 | 1 | 8.4 | 1260 | 1.4 | |
| 5 | $C_{18}H_{37}-\overset{O}{\underset{OC_4H_5}{\overset{\|}{P}}}-O^{\ominus}$ | — | 1 | 2 | 6.5 | 980 | 1.8 | |
| 6 | $(n-C_4H_9-O)_2\overset{O}{\overset{\|}{P}}-O^{\ominus}$ | — | 1 | 1 | 9.6 | 1440 | 1.25 | $NiY_2$ alone is not compatible |
| 7 | $C_{12}H_{25}-O-\overset{O}{\underset{H}{\overset{\|}{P}}}-O^{\ominus}$ | 2 | 1 | 1 | 6.0 | 900 | — | |
| 8 | 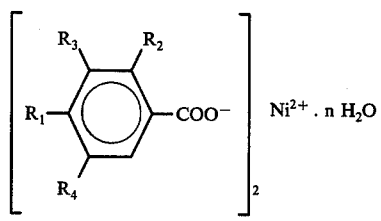 $X=HO-C_6H_2(t-Bu)_2-COO^{\ominus}$ | 1½ | — | — | 12.0 | 1800 | — | |

[1] Component I here is in each case the nickel salt of 4-hydroxy-3,5-di-tert.-butylbenzoic acid (having n = 1.5)
[2] h is time for loss of tensile strength of 50% (hours)
[3] substrate is in each case polypropylene Shell Carlona HY61 (1090/1535) code SLAφ5, concentration is 0,5%, Xeno type is 1200.

What we claim is:

1. Mixtures consisting of a compound of the formula I $$\left[ \begin{array}{c} R_3 \quad R_2 \\ R_1-\bigcirc-COO^- \\ R_4 \end{array} \right]_2 Ni^{2+} \cdot n\, H_2O \quad (I)$$

wherein either $R_1$ represents a hydroxyl group and $R_2$ represents hydrogen or $R_1$ represents hydrogen and $R_2$ represents a hydroxyl group, $R_3$ and $R_4$ independently of one another represent hydrogen or alkyl, and n represents a value from 0 to 2, and a compound of the formula II

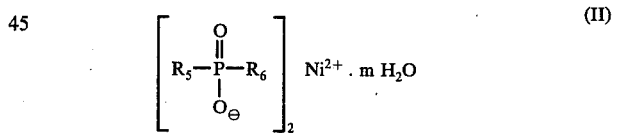

wherein $R_5$ represents alkyl, cycloalkyl, aralkyl, aryl or aralkyl or aryl groups which are mono-, di- or tri-substituted by hydroxyl, alkyl, chlorine and/or alkoxy groups, alkoxy, cycloalkoxy, aralkoxy, aryloxy, or aralkoxy or aryloxy which are mono-substituted or di-substituted in the aryl radical by alkyl, chlorine and/or alkoxy, $R_6$ represents hydrogen, alkyl, cycloalkyl, aralkyl, aryl or aralkyl or aryl groups which are mono-, di- or tri-substituted by hydroxyl, alkyl, chlorine and/or alkoxy groups, alkoxy, cycloalkoxy, aralkoxy, aryloxy or aralkoxy or aryloxy which are mono-substituted or di-substituted in the aryl radical by alkyl, chlorine and/or alkoxy, and m represents a value from 0 to 2.5.

2. Mixtures according to claim 1, wherein $R_1$ denotes a hydroxyl group, $R_2$ denotes hydrogen, $R_3$ and $R_4$ independently of one another denote hydrogen or alkyl having 1 to 5 carbon atoms, $R_5$ denotes alkyl having 1 to 18 atoms, cyclohexyl, aralkyl having 7 to 11 carbon atoms, aryl having 6 to 1 carbon atoms, aralkyl or aryl groups which are mono-, di- or tri-substituted by hydroxyl, alkyl having 1 to 4 carbon atoms, chlorine and/or alkoxy groups having 1 to 4 carbon atoms, the aralkyl radical containing 7 to 11 carbon atoms and the aryl radical containing 6 to 10 carbon atoms, alkoxy having 1 to 12 carbon atoms, cyclohexoxy, aralkoxy having 7 to 11 carbon atoms, aryloxy having 6 to 10 carbon atoms, or aralkoxy or aryloxy which are substituted in the aryl radical by methyl, chlorine and/or methoxy, the aralkoxy radical containing 7 to 11 carbon atoms and the aryloxy radical containing 6 to 10 carbon atoms, and $R_6$ denotes hydrogen, alkyl having 1 to 18 carbon atoms, cyclohexyl, aralkyl having 7 to 11 carbon atoms, aryl having 6 to 10 carbon atoms, aralkyl or aryl which are mono-, di- or tri-substituted by hydroxyl, alkyl having 1 to 4 carbon atoms, chlorine and/or alkoxy groups having 1 to 4 carbon atoms, the aralkyl radical containing 7 to 11 carbon atoms and the aryl radical containing 6 to 10 carbon atoms, alkoxy having 1 to 12 carbon atoms, cyclohexoxy, aralkoxy having 7 to 11 carbon atoms, aryloxy having 6 to 10 carbon atoms, or aralkoxy or aryloxy which are substituted in the aryl radical by methyl, chlorine and/or methoxy, the aralkoxy radical containing 7 to 11 carbon atoms and the aryloxy radical containing 6 to 10 carbon atoms.

3. Mixtures according to claim 2, wherein $R_3$ and $R_4$ denote tert.-butyl, $R_5$ denotes alkyl having 2 to 18 carbon atoms, cyclohexyl, benzyl, phenyl, 4-hydroxy-3,5-di-tert.-butylbenzyl, alkoxy having 1 to 8 carbon atoms, or phenoxy, $R_6$ denotes hydrogen, alkyl having 2 to 12 carbon atoms, cyclohexyl, phenyl or alkoxy having 2 to 8 carbon atoms, n denotes 1 to 1.5 and m denotes 0 to 2.

4. Mixtures according to claim 3, wherein $R_5$ denotes alkyl having 3 to 18 carbon atoms, 4-hydroxy-3,5-di-tert.-butylbenzyl, n-butoxy or phenoxy, $R_6$ denotes alkoxy having 2 to 8 carbon atoms, n denotes 1.5 and m denotes 0 to 2.

5. Mixtures according to claim 1, in which the molar ratio of the compounds I and II is 1:05 to 1:2.

6. Mixtures according to claim 3, wherein the molar ratio of the compounds I and II is 1:1 to 1:2.

7. Mixture according to claim 1, consisting of

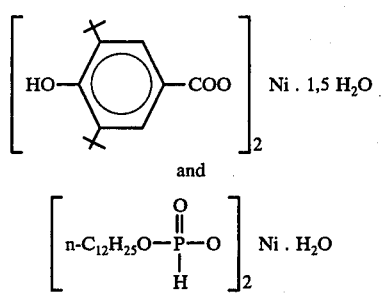

in the molar ratio of 1:1.

8. Mixture according to claim 1, consisting of

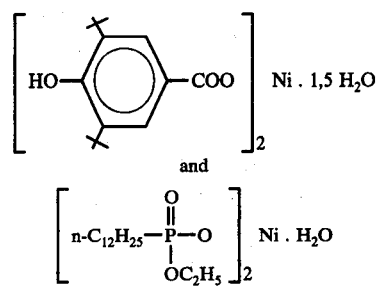

in the molar ratio of 1:1.

9. Mixture according to claim 1, consisting of

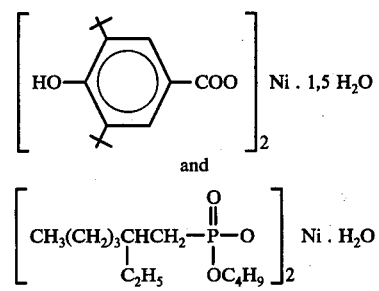

in the molar ratio of 1:1.

10. Mixture according to claim 1, consisting of

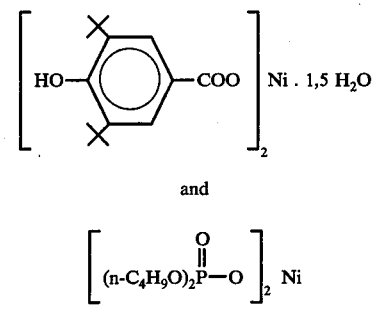

in the molar ratio of 1:1.

11. Mixture according to claim 1, consisting of

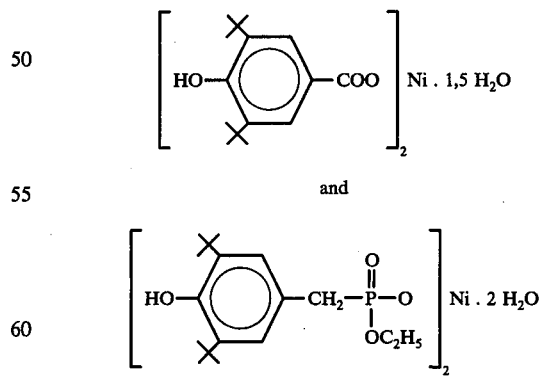

in the molar ratio of 1:1.

* * * * *